R. B. RESPESS.
LEATHER SUBSTITUTE AND PROCESS FOR MAKING THE SAME.
APPLICATION FILED JAN. 18, 1918.

1,319,795.

Patented Oct. 28, 1919.

INVENTOR
Roland B. Respess
BY A. A. de Bonneville
ATTORNEY

UNITED STATES PATENT OFFICE.

ROLAND B. RESPESS, OF NEW YORK, N. Y.

LEATHER SUBSTITUTE AND PROCESS FOR MAKING THE SAME.

1,319,795.     Specification of Letters Patent.     Patented Oct. 28, 1919.

Application filed January 18, 1918. Serial No. 212,416.

*To all whom it may concern:*

Be it known that I, ROLAND B. RESPESS, a citizen of the United States, and a resident of the borough of Manhattan, city of New York, in the county of New York and State of New York, have invented certain new and useful Improvements in Leather Substitutes and Processes for Making the Same, of which the following is a specification.

This invention relates to a leather substitute and process for making the same, and is an improvement of my invention for rubber fabrics and molded rubber and process of making the same, filed July 13th, 1917, Serial Number 180,428.

One of the objects of this invention is the production of a strong, pliable unwoven fabric, which is tough and durable and that can be used as a leather substitute; as sole leather for shoes, for belting and the like and which can be vulcanized.

A further object of the invention is the production of a strong, unwoven fabric that is tough and durable and which has incorporated therein cords or threads to produce great strength, when used for belting and the like and which may be vulcanized.

In general terms the leather substitute is made by forming a sheet or mat of vegetable fibers such as cotton, hemp, flax and the like, in which the fibers may be matted in all directions, or combed in one direction, or crossed at angles to each other, depending on the use to which it is to be applied.

The sheet or mat is saturated with a solution of rubber and sulfur or other vulcanizing agent, dried and compressed. The sheets are then coated with rubber containing vulcanizing agents and subjected to heat under heavy pressure to vulcanize the same.

Figure 1:
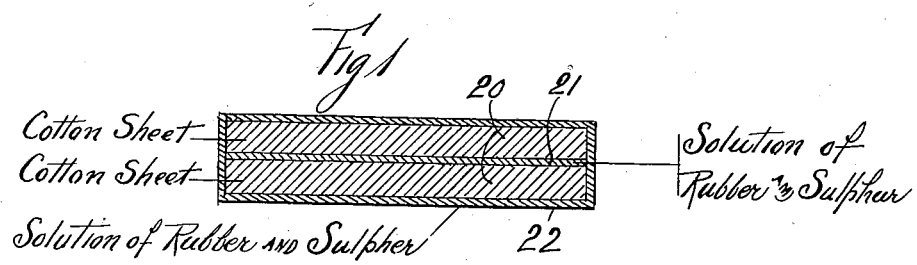
Figure 2:
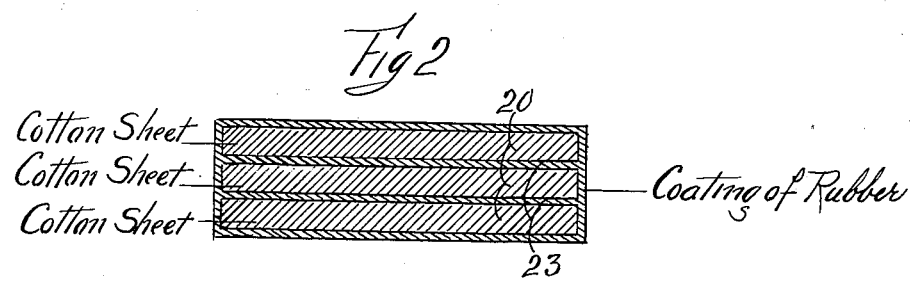
Figure 3:
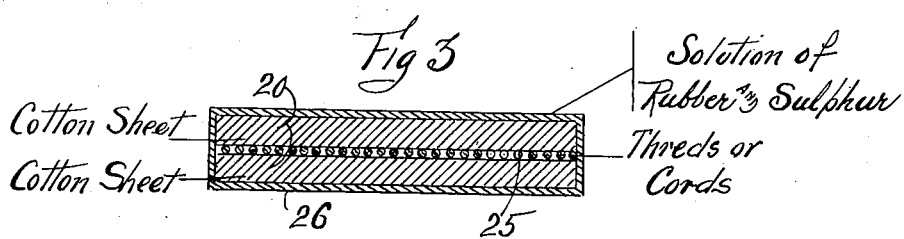
Figure 4:
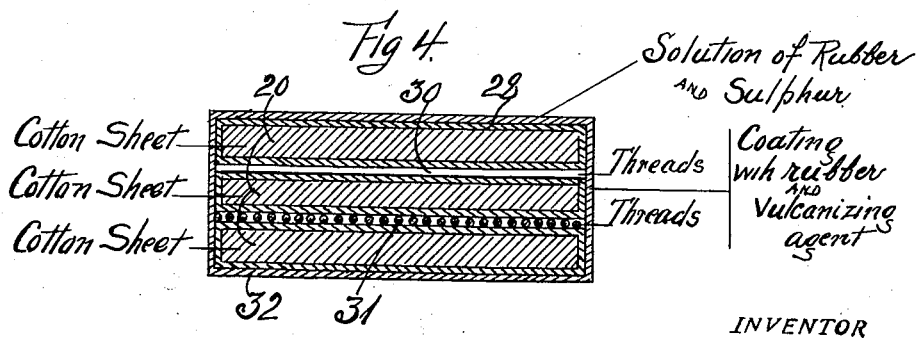

In the drawings Figure 1 shows a sectional view of a pair of sheets or mats; Fig. 2 shows a sectional view of a plurality of sheets or mats; Fig. 3 shows a sectional view of a pair of sheets with threads or cords between them and Fig. 4 shows a sectional view of a plurality of sheets with threads or cords between them.

Referring to Fig. 1 raw cotton is formed into mats or sheets 20 by means of a carding or other suitable machine. A pair of these sheets are then superimposed on each other and a solution of rubber containing sulfur and rubber indicated at 21 is introduced between the layers of cotton sheets. The pair of sheets are subjected to a slight pressure to cause the solution of rubber to spread through and between the fibers of the sheets. The sheets are next dried and pressed after which the outside faces of the double sheet are treated with a solution 22 of rubber and sulfur. The double sheet is then dried and pressed to form a compact strong and flexible sheet. The introduction of the rubber is for the purpose of providing a binding agent which will bind the fibers together when dried and pressed. As the sheets are to be vulcanized an additional quantity of rubber and vulcanizing agent must be incorporated therein. The steps for the latter are as follows: The compressed sheets are treated with a coating of rubber containing a vulcanizing agent and then heated under pressure. The rubber and vulcanizing agent run into the pressed cotton sheets in sufficient quantity for vulcanization.

In Fig. 2 thicker sheets are made by superimposing a plurality of single sheets 20 with coatings 23 of rubber between them. They are then subjected to heat under pressure by virtue of which the rubber liquefies and saturates the pressed fiber sheets 20 and vulcanizes them into one solid mass.

In Fig. 3 threads or cords are incorporated with the fiber sheets, the threads or cords are placed on spools or other suitable containers. The containers are located in frames from which the cords or threads may be unwound, and by means of guides directed to and through a binding agent consisting of a solution of rubber and sulfur. The threads are then led to a gathering roll or drum over which a sheet or mat of the fibers is passed and the coated threads or cords are laid thereon. The binding agent causes the coated threads or cords to adhere to the fiber sheet, which is then dried. Next another sheet or mat 20 of fibers is placed upon the sheet having the threads or cords thereon. The double sheet with the threads or cords between them is then saturated with a solution 26 of rubber and sulfur, dried and pressed.

Fig. 4 shows a fabric of considerable thickness comprising several layers of sheets 20 superimposed on each other, with one or both sides of the compressed sheets coated with the rubber containing the vulcanizing agent 28 and the built up section is heated under pressure and vulcanized. When threads are incorporated between the sheets and it is desirable to have the threads located in more than one direction, a sheet of the fiber may be made with the cords 30 running lengthwise thereof, and a second sheet above or below the first sheet with the threads 31 running crosswise thereof. The second sheet is produced from a sheet with the threads running lengthwise by cutting the same into sections and locating the sections above or below the other sheet with the sections adjoining each other and the threads running crosswise of the double sheet. The layers of sheets are then saturated with a solution 32 of rubber and sulfur, dried and pressed.

When it is desired to manufacture a product of a color different from the natural color of the fibers, the latter may be dyed before being formed into mats or sheets, or a coloring agent may be introduced into the rubber with the vulcanizing agent or both steps may be used.

Having described my invention what I desire to secure by Letters Patent and claim is:

1. The herein described process of making a leather substitute consisting in forming a sheet of fibers, saturating the sheet with a solution of a binding agent, drying and compressing the sheet, coating the sheet with rubber containing a vulcanizing agent, and heating under pressure to vulcanize the sheet.

2. The herein described process of making a leather substitute consisting in forming a sheet of fibers, saturating the sheet with a solution of a binding agent, drying and compressing the sheet, coating strings with a solution of rubber and a vulcanizing agent, locating the coated strings upon the fiber sheets to adhere thereto, drying, repeating the steps with another sheet of fiber and strings, placing the sheets upon each other with the strings between them, saturating the double sheet with a solution of rubber and a vulcanizing agent, drying the double sheet and pressing.

3. The herein described process of making a leather substitute consisting in taking a plurality of sheets of fiber, saturating each sheet with a solution of a binding agent, drying and compressing the sheet, coating strings with a solution of rubber and a vulcanizing agent, locating the coated strings between the fiber sheets, saturating the product so far formed with a solution of rubber and a vulcanizing agent, drying and pressing the product.

4. The herein described process of making a leather substitute consisting in taking a plurality of sheets of fiber, saturating each sheet with a solution of a binding agent, drying and compressing each sheet, coating strings with a solution of rubber and a vulcanizing agent, locating the strings between the fiber sheets, the strings between one pair of sheets running in one direction, and the directions of the strings in the space next adjacent between the sheets making angles with the other lot of strings, saturating the product with a solution of rubber and a vulcanizing agent, drying and pressing the same.

5. A substitute for leather comprising a plurality of sheets of fibers, strings coated with a solution of rubber and a vulcanizing agent located between the sheets of fibers and a coating of rubber with a vulcanizing agent for the product.

6. A substitute for leather comprising a plurality of sheets of cotton, strings coated with rubber and a vulcanizing agent between the sheets and a coating of rubber with a vulcanizing agent for the product.

7. A substitute for leather comprising a plurality of sheets of fibers, strings coated with rubber and a vulcanizing agent between the sheets, the strings between one pair of sheets running in one direction and the strings between other pairs of sheets running in directions making angles with the strings between the first pair of sheets and a coating of rubber with a vulcanizing agent for the product.

Signed at the borough of Manhattan, city of New York, in the county of New York and State of New York this 9th day of January A. D. 1918.

ROLAND B. RESPESS.

Witnesses:
A. A. DE BONNEVILLE,
A. W. BAKER.